United States Patent [19]

Neff et al.

[11] Patent Number: 5,286,806

[45] Date of Patent: Feb. 15, 1994

[54] METHODS OF MAKING AND USING HIGH MOLECULAR WEIGHT ACRYLAMIDE POLYMERS

[75] Inventors: Roger E. Neff, Stamford; Roderick G. Ryles, Milford, both of Conn.

[73] Assignee: American Cyanamid Company, Stamford, Conn.

[21] Appl. No.: 62,379

[22] Filed: May 14, 1993

[51] Int. Cl.$^5$ ................................. C08F 8/12
[52] U.S. Cl. .................... 525/369; 524/555; 524/801; 525/329.4; 525/378
[58] Field of Search ................ 525/369, 378

[56] References Cited

U.S. PATENT DOCUMENTS

| | | | |
|---|---|---|---|
| 3,284,393 | 11/1966 | Vanderhoff et al. | 525/369 |
| 3,624,019 | 11/1971 | Anderson et al. | 525/369 |
| 4,146,690 | 3/1979 | Tago et al. | 525/369 |
| 4,171,296 | 10/1979 | Connelly et al. | 525/369 |
| 4,482,682 | 11/1984 | Kudomi et al. | 525/369 |
| 4,535,131 | 8/1985 | Handa et al. | 525/369 |
| 4,673,716 | 6/1987 | Jiano et al. | 525/369 |
| 5,081,195 | 1/1992 | Atkins et al. | 525/369 |

*Primary Examiner*—Bernard Lipman
*Attorney, Agent, or Firm*—Frank M. Van Riet

[57] ABSTRACT

Dispersions of finely divided high molecular weight polyacrylamide particles are formed and treated with a caustic material to hydrolyze the polymer without undesirable side chain reactions to form high molecular weight anionic acrylamide polymers. A preferred technique for forming these products comprises the formation of a stabilized water-in-oil emulsion of aqueous acrylamide monomer, polymerizing the monomer, reacting the polymer emulsion thus formed with a hydrolysis agent and inverting the resultant hydrolyzed polymers into solution. These materials are useful in a variety of industrial applications for removing particulates from effluent streams.

8 Claims, No Drawings

METHODS OF MAKING AND USING HIGH MOLECULAR WEIGHT ACRYLAMIDE POLYMERS

TECHNICAL FIELD

The invention relates generally to the preparation and use of acrylamide polymers. More particularly, the invention is directed to methods of making high and ultra high molecular weight anionic acrylamide polymers as well as methods for using these materials in a variety of industrial flocculation applications.

BACKGROUND OF THE INVENTION

Aqueous solutions of acrylamide polymers (i.e., "polyacrylamides" or "PAMs") are useful in applications such as thickening and dewatering of industrial and sewage wastes and the clarification, i.e., by flocculation techniques, of turbid aqueous solutions. In addition, as discussed for example in U.S. Pat. No. 4,034,809 to Phillips et al., these materials have also been found to be useful in secondary and tertiary oil recovery processes wherein the polymer solution is introduced into subterranean oil-bearing formations to help increase the amount of crude oil recovered.

Typically, PAMs are available as powders or as finely divided solids and are dissolved in water to form aqueous solutions for use in a particular application. It is difficult and time-consuming, however, to dissolve these dry polymers in water, particularly in the case of hydrolyzed acrylamide polymers. This is because the dry polymer is not readily dispersable in the liquid and thus has a tendency to form lumps upon contact with the water. Such lumps typically require an extended period, sometimes as long as 6–10 hours, to dissolve.

U.S. Pat. No. 3,624,019 to Anderson et al. discloses a polymeric latex comprising a water-in-oil emulsion having dispersed therein finely divided droplets of a water-soluble vinyl addition polymer solution. Polyacrylamide is a preferred polymer disclosed by the reference. The polymer-containing emulsions described by Anderson et al. are stable. When inverted in the presence of water, the polymer goes into solution in a very short period of time as compared to the extended, i.e., 6–8 hour, period required for the dissolution of a dry solid polymer as described above. A water-in-oil polymerization process and method for making latex polymers is described in U.S. Pat. No. 3,284,393 to Vanderhoff et al.

A major problem associated with acrylamide polymer lattices of the type described above, however, is that when they are hydrolyzed, the latex becomes unstable. The polymer present within the latex coagulates and precipitates out of the water-in-oil emulsion, thus producing a product with little or no commercial value.

U.S. Pat. No. 4,171,296 to Connelly et al. discloses a method for hydrolyzing acrylamide polymers within a polymer latex, comprising a water-in-oil emulsion containing finely divided polyacrylamide, wherein the latex is stabilized by the addition of an alkali stable organic surfactant prior to hydrolysis. The method for producing the acrylamide polymer emulsion comprises polymerizing the acrylamide monomer utilizing an azo catalyst, i.e., 2,2'-azobis (isobutyronitrile) and a sequential monomer addition process. The disclosure of this reference is also limited to the production of polymers ranging in molecular weight from about 10,000 to 25,000,000.

Polymers such as those disclosed in Connelly et al., i.e., with a molecular weight up to about 25 million, are known to be relatively insensitive to detrimental side reactions. Such reactions have more of a tendency to occur in ultra high molecular weight PAMs. That is, the higher the molecular weight of the polymer, the greater the propensity for the polymer to become cross linked. These side reactions are known to lead to decreased performance by the polymer. Thus one skilled in the art would try to avoid them by the use of low to medium molecular weight acrylamide polymers.

There has therefore been a long felt need by those working in this field for partially hydrolyzed high and ultra high molecular weight acrylamide polymers for use in thickening and flocculating applications. Thus, an effective, efficient method for hydrolyzing high molecular weight acrylamide polymer emulsions, while reducing or eliminating entirely the degree of side chain reactions, to form, respectively, high and ultra high molecular weight polymers, is both desirable and needed. Ultra high molecular weight polymers are particularly useful and are thus of even greater value due to their capacity to more effectively flocculate solids.

SUMMARY OF THE INVENTION

The present invention thus relates to methods for making and using an improved flocculating agent comprising partially hydrolyzed "high molecular weight" acrylamide polymers and preferably using polymers of "ultra high molecular weight." These terms are further defined below.

As used herein, the term "flocculating agent" is used generically to mean any material capable, upon application to a liquid stream containing a plurality of solid particles, of removing the solid particles from the stream to produce a substantially clear effluent. Thus "flocculation" as used herein broadly encompasses a variety of methods for the clarification of liquid effluents such as, e.g., mill waste water streams.

The phrase "high molecular weight" as used herein refers to acrylamide polymers having a molecular weight of at least about 10 million. Moreover, the phrase, "ultra high molecular weight", as used herein, means a polymer having a molecular weight of at least about 27 million. Ultra high molecular weight polymers are, as noted above, preferred for use with the invention. For convenience, unless otherwise indicated hereinafter, the phrase "high molecular weight" is used herein to include both "high" and "ultra-high" molecular weight polymers as defined above.

In the invention, liquid streams, i.e., of the type described above, are treated with a polymer solution prepared as follows: A water-in-oil emulsion which comprises, as the discontinuous phase, small droplets of an aqueous acrylamide monomer solution containing a redox polymerization catalyst and, as the continuous phase, a liquid hydrocarbon containing an oil-soluble emulsifying agent is formed. The acrylamide monomer is then polymerized to form aqueous acrylamide polymer droplets within the emulsion. One embodiment of the invention utilizes high molecular weight polymers with a molecular weight of 10+ million. In a further embodiment, ultra high molecular weight polymers, with a molecular weight above about 27 million are used. At molecular weights of about 27 million and above, the need to reduce or eliminate side chain reaction becomes a factor in the polymer forming process. In a still further embodiment, the molecular weight range of the ultra high molecular weight polymers used is 34+ million. The emulsion is stabilized by the addition of an oil-soluble emulsifying agent or an organic surfactant.

The flocculant formation process thereafter further comprises at least partially hydrolyzing the acrylamide polymer by the addition of a caustic material (i.e., so as to convert at least a portion of the amide groups on the polymer to carboxylate groups), which results in the formation of a partially hydrolyzed high molecular weight anionic acrylamide polymer flocculating agent. The flocculating agent is then added to a solids-containing liquid stream for agglomeration and subsequent removal of the solids therefrom.

The flocculating agents thus produced have improved properties and are therefore particularly useful, as described below, in a variety of industrial solid-liquid separations such as in flocculating mineral slurries or effluents from, for example, paper mills or deinking plants. The flocculating agents of the invention are particularly effective in removing solids from such liquid effluents to form substantially clear liquid discharge streams. That is, with the use of the high molecular weight acrylamide polymers of the invention, the speed and efficiency of flocculation is substantially enhanced in comparison to processes utilizing prior art products comprising low to medium weight polymers.

The improvements noted above include, for example, reducing the settling times and increasing the settling rate of flocculated systems (see, e.g., Examples 3, 4, 14 and 15 below). Further, the use of the preferable ultra high molecular weight PAM flocculating agents described herein additionally permits the user to achieve a substantial reduction in the amount of suspended solids in the liquid stream at dosages greatly reduced from those required with the use of prior art low to medium molecular weight PAMs (see, e.g., Example 6).

DETAILED DESCRIPTION OF THE PREFERRED EMBODIMENTS

The first stage in the process of the invention is the formation of the polymer emulsion. This involves several steps as described below. In a first step a water-in-oil emulsion is formed, comprising small droplets of an aqueous acrylamide monomer solution as the discontinuous phase. The continuous phase of the emulsion is a liquid hydrocarbon containing an oil soluble emulsifying agent. The emulsion additionally contains a redox polymerization catalyst, such as one of those disclosed in U.S. Pat. No. 4,339,371 to Robinson et al., the disclosure which is incorporated herein by reference. In general, useful catalyst systems include, for example, persulfate-mercaptan systems, persulfate-sulfite systems, chlorate-bisulfite systems and hydrogen peroxide-iron systems. The most preferred redox catalyst for use in the invention is tertiary butyl hydroperoxide-sodium metabisulfite.

Once the emulsion is formed, the acrylamide monomer is bulk polymerized with the aid of the catalyst to convert the discontinuous phase to a plurality of aqueous acrylamide high molecular weight polymer droplets. The polymer preferably has a molecular weight of at least about 10 million. Such polymeric lattices and the method of their production are described in U.S. Pat. Nos. 3,624,019 to Anderson et al. and 3,284,393 to Vanderhoff et al. discussed above, the disclosure of each of which is incorporated herein by reference.

The polymer is thereafter hydrolyzed as described further below. The molecular weight of the hydrolyzed product is indicated by a corresponding intrinsic viscosity of at least about 15 dl/g. and a solution viscosity of at least about 4 mPa.s. More preferably, the polymer is an ultra high molecular weight polymer with a molecular weight of greater than about 27 million having an intrinsic viscosity of at least about 32 dl/g. and a solution viscosity of at least about 7 mPa.s. Most preferably, the molecular weight of the polymer is 34 million or greater with a corresponding intrinsic viscosity of 35 dl/g. and a solution viscosity of at least about 7 mPa.s.

The molecular weight of the polymers produced as described above may be determined, e.g., by viscometry methods such as Solution (also known as "Standard") Viscosity ("SV"), or Intrinsic Viscosity ("IV"). Both of these processes are well-known to persons of ordinary skill in the art.

It is also well known in the art that the intrinsic viscosity of a polymer correlates to the molecular weight of that polymer using the formula:

$$IV = 0.000373 \times \text{molecular weight}^{0.66} \quad (1)$$

Intrinsic viscosity is a cumbersome and time consuming property to measure, however. As practiced in the present invention, the IV measurement is taken with a four bulb Cannon-Ubbelohde capillary viscometer at concentrations of, for instance, 100, 250, 500 and 1,000 ppm in 1 molar sodium chloride at 30° C. and at shear rates ranging between 50–1,000 sec$^{-1}$. The data thus obtained is subjected to linear regression to extrapolate it to zero shear rate and zero polymer concentration. The value obtained with this calculation is the intrinsic viscosity of the polymer.

Solution (i.e., standard) viscosity values are relatively easier, i.e., less cumbersome and time consuming, to obtain than intrinsic viscosity values. Moreover, SV values can be correlated to IV values for a particular polymer. Thus, polymeric molecular weights can be approximated by reference to the solution viscosity of the polymer. That is, the higher the SV value for a particular polymer, the higher its molecular weight. For example (the following values are approximate):

$SV$ 4 mPa.s = $IV$ 15 dl/g. = $MW$ 10,000,000

$SV$ 5 mPa.s = $IV$ 25 dl/g. = $MW$ 20,000,000

$SV$ 6 mPa.s = $IV$ 30 dl/g. = $MW$ 26,000,000

$SV$ 7 mPa.s = $IV$ 32 dl/g. = $MW$ 30,000,000

$SV$ 10.9 mPa.s = $IV$ 50 dl/g. = $MW$ 60,000,000

For purposes of the present invention, SV values are determined using a 0.1% polymer solution in 1 molar NaCl at 25° C. The measurement is taken using a Brookfield viscometer with a UL adapter at 60 rpm when the SV is 10 or less. When the SV is greater than 10, the viscosity at 30 rpm is determined and multiplied by 1.7.

A correlation also exists between the standard viscosity value of a polymer and the degree of hydrolysis to which the polymer has been subjected. That is, for polymers wherein the degree of hydrolysis (i.e., the degree to which the amide groups are converted to carboxylate groups) is generally at least about 5 mole %, the SV value is about 7 mPa.s or greater. For those polymers having a degree of hydrolysis of about 10 mole % or greater, the SV is generally at least about 8 mPa.s. Further, when the hydrolysis range is about 20 mole % or more, the SV value is generally at least about 9 mPa.s.

The relation between the SV and IV of a polymer and the use of this information to determine the molecular weight of the polymer is clearly set forth in the Examples provided below. In Example 13, for instance, both the SV and IV values were measured for a solution of the polymer formed in Example 1. The molecular weight of the polymer was then determined from the IV value with the use of formula (1) noted above. Thus, in a case where only the SV value of the polymer (and not the IV) is known (see, e.g., Examples 10-12), it is a simple matter to roughly determine the polymer's approximate molecular weight by estimating the IV from a linear relationship of two extremes and then using Equation 1 hereinabove.

Thus although one can calculate with a high degree of exactitude the molecular weight of a polymer within a solution using the IV value of the subject polymer with the Formula 1 provided above, the difficulty in obtaining these IV values, in terms of time and attention to detail required, is outweighed by the relative ease of using SV values for this purpose. This is because such SV values are relatively simple to obtain and may be mathematically correlated, as explained above, to corresponding IV values, thus permitting one to obtain a rough determination of the polymer's molecular weight based upon the SV value of the solution alone. As noted above, the preferred PAMs for use with the present invention, are those having an ultra high molecular weight of at least about 27 million, an intrinsic viscosity (IV) value of at least about 32 dl./g and a solution viscosity (SV) value of at least about 7 mPa.s. It is even more preferred, however, to use PAMs having a molecular weight of 34 million or more.

Further with regard to the formation of the polymer emulsion, the oils used therein to form the continuous phase are selected from a large group of organic liquids including liquid hydrocarbons and substituted liquid hydrocarbons. Useful liquid hydrocarbons include, but are not limited to, aromatic and aliphatic compounds such as benzene, xylene, toluene, mineral oils, kerosenes and napthas. The preferred oils for use with the invention are the cyclic linear or branched paraffinic oils. These materials are preferred because they are inexpensive, insoluble in water, relatively non-toxic and because, due to their relatively high flash point, they create a minimal fire risk in industrial applications.

The relative amounts of the components which comprise the emulsion may vary over a wide range. Generally however, the emulsion is comprised of from about 20 to about 50% by weight of water; from about 10 to about 40% by weight of the oil and from about 20 to about 40% by weight of high molecular weight acrylamide polymer. In order to obtain a stable emulsion, it is generally necessary, however, to add an oil soluble emulsifying agent or an organic surfactant.

When adding an oil soluble emulsifying agent, the required amount of this agent may be determined by routine experimentation. Generally, however, an amount ranging from about 0.1 to about 30% by weight, based upon the weight of the oil, is used. More preferably, the amount used is within the range of about 3 to about 15% by weight of the oil.

Emulsifiers useful in the invention are known in the art as "low HLB materials", wherein HLB stands for "hydrophilic-lyophilic balance". These materials are well documented in the relevant literature, for example, the Atlas HLB Surfactant Selector which is commonly referred to by those in this field.

Preferred emulsifiers include the sorbitan esters and their ethoxylated derivatives. Sorbitan monooleate is particularly preferred for this purpose. Other emulsifiers which may be used include, for example, those discussed in U.S. Pat. No. 3,284,393 to Vanderoff et al. noted above. The invention is not limited only to these emulsifiers, however. Other emulsifiers, such as certain high HLB materials, may be used as long as they are capable of producing good water-in-oil emulsions.

Turning now to a discussion of organic surfactants for use with the present invention, these materials must be capable of stabilizing the final product. Any compound meeting this requirement may be used. The surfactant chosen for use in a particular application should, however, be tried first with a small sample and used on a case by case basis to prevent untoward effects due to variations in the polymeric emulsion and/or the hydrolysis agents.

Preferred organic surfactants are formed by the reaction of an aliphatic hydrocarbon alcohol or amine, wherein the alcohol or amine preferably has from 10 to 20 carbon atoms, with from 2 to 10 moles of ethylene oxide per mole of the alcohol or amine. However, other amines and alcohols, i.e., those having more than 20, or less than 10 (but at least 8) carbon atoms, are also capable of use in the invention. Most preferably, the alcohol or amine comprises from 12 to 18 carbon atoms and is reacted with from 2 to 4 moles of ethylene oxide per mole of the alcohol or amine.

A particularly preferred surfactant is formed by reacting oleyl amine with ethylene oxide to form an ethoyxlated oleyl amine. Other useful organic surfactants are formed, for example: (a) by reacting one mole of oleyl alcohol with two moles of ethylene oxide to form polyoxyethylene (2) oleyl alcohol, or (b) by reacting one mole of lauryl alcohol and four moles of ethylene oxide to form polyoxyethylene (4) lauryl ether.

In one embodiment of the invention, the surfactant is added to the polymeric emulsion in a concentration of from 0.10 to 15% by weight of the emulsion and thoroughly mixed therewith. It is most preferred, however, to use a concentration of the surfactant ranging between about 0.5 to 3% by weight.

In a preferred embodiment, the polymeric emulsion is formed as described above, having dispersed therein: (1) finely divided droplets of an aqueous solution of high molecular weight acrylamide polymer, and (2) an organic surfactant formed, e.g., by the reaction of an aliphatic hydrocarbon alcohol with from 10 to 20 carbon atoms and from 2-10 moles of ethylene oxide per mole of the alcohol. In a subsequent step, the polymer is reacted with a "hydrolysis agent," as described below, to form a hydrolyzed high molecular weight acrylamide polymer. The advantage of using this process is that there is one less step in the method, i.e., the organic surfactant is already present in the polymeric emulsion.

Hydrolysis agents useful in the present invention include, but are not limited to, alkali metal hydroxides and quaternary ammonium hydroxides. A useful quaternary ammonium hydroxide is tetra methyl ammonium hydroxide. The preferred hydrolysis agents, however, are the alkali metal hydroxides and, more particularly, sodium, potassium, and lithium hydroxides. In fact, however, any material which will provide an alkali solution may be used as a hydrolysis agent.

In the process of the invention the hydrolysis agent should be added to the polymeric emulsion as an aqueous solution slowly and with mixing. The most preferred hydrolysis agent is a 10-50% aqueous solution of alkali metal hydroxide, with a 20-40% solution being more preferred and a solution of about 30% being most preferred. The concentration of the solution of the alkali metal hydroxide is within the range of 0.2-30%, preferably 4-12%, by weight based on the polymeric emulsion. The percentage of hydrolysis agent used will vary however, according to the degree of hydrolysis desired.

While solutions of about 30% concentration of the alkali metal hydroxides are, as noted above particularly useful, it is important to note that higher or lower concentrations of alkali metal hydroxides in aqueous media may also be used. Conditions favoring the use of lower concentrations of the hydrolysis agent include the desire for low levels of hydrolysis and stability factors. Higher concentrations may be used when a substantial degree of hydrolysis is desired without excessive dilution. As would be understood by one skilled in the art, stability considerations also play a role in this determination.

The hydrolysis reaction may be conducted at room temperature but more favorable results are obtained at elevated temperatures. Generally the reaction may be performed within the range of from about 10°-70° C. The preferred temperature range for this reaction is, however, from about 35°-55° C. The length of time required for the hydrolysis reaction depends upon the reactants, their concentrations, the reaction conditions and the degree of hydrolysis desired.

The acrylamide polymer of the present invention is hydrolyzed by the process set forth herein to a degree of between about 3-80%. Depending upon the reaction conditions described above, typically a 5-60% hydrolysis is obtained, with the preferred range being 10-50%. This hydrolysis procedure and all of the reaction conditions and ranges described herein apply to both embodiments of this invention: that is, (1) the formation of the polymeric emulsion including the organic surfactant or emulsifier and (2) the addition, in a separate step, of the organic surfactant or emulsifier to the polymeric emulsion.

After the reaction with the hydrolysis agent, the hydrolyzed acrylamide polymer thus formed remains dispersed throughout the water-in-oil emulsion, similar to those emulsions disclosed in U.S. Pat. No. 3,624,019 to Anderson et al. discussed above. The hydrolyzed polymer emulsion is thereafter inverted in a manner similar to that disclosed in Anderson et al. such that the emulsion releases the hydrolyzed acrylamide polymer in water in a very short period of time.

To accomplish this result, it is preferred, or it may be necessary, to employ a second surfactant (i.e., an "inverting agent") by adding it to either the polymer-containing emulsion or to the water into which the emulsion is to be dissolved. Alternatively, the surfactant used to form the emulsion may be self-inverting and no secondary emulsifier addition is necessary. These so-called "breaker" materials preferably have a hydrophilic-lyophilic balance ("HLB") greater than about 10. They preferably include the ethoxylated alcohols; ethoxylated alkyl phenols and the ethoxylated amines, as well as a variety of other compositions known to those of ordinary skill in the art. A particularly preferred surfactant for use in inverting the anionic high molecular weight PAM is nonylphenyl ethoxylate.

The addition of the inverting agent causes the emulsion to rapidly release the polymer in the form of an aqueous solution. The surfactants listed in Anderson et al. have been found to easily invert hydrolyzed acrylamide polymer. However, due to variations in the polymeric lattices, surfactants used for inversion should be tried on a case by case basis.

The polymers thus produced are useful, as noted above, in a variety of industrial flocculation applications. The performance of the preferred hydrolyzed ultra high molecular weight polymers thus formed has in fact been found to be vastly improved over those chemically similar polymers produced as in U.S. Pat. No. 4,171,296 in applications such as settling processes, where molecular weight is a controlling variable.

One such application is in flocculating mineral slurries. The method comprises adding to such a slurry an effective amount, i.e., between about 1 and 10,000 ppm, and preferably between about 10-1,000 ppm, based on the solid content of the slurry, of the high molecular weight anionic water-in-oil emulsion of partially hydrolyzed acrylamide polymer to flocculate the solid particles within the slurry. These particles are then removed from the slurry, leaving a substantially clear liquid stream. The solution of the emulsion used to flocculate the slurry preferably contains a concentration of the emulsion of between about 0.05 and 3% by weight.

An additional embodiment of the invention concerns the use of the high molecular weight polymer emulsion described above for flocculating, for example, effluent from a paper mill or alternatively, a process water stream from a deinking plant where ink is removed from paper to permit the fibers to be recycled. In contrast to the process described above, this embodiment entails a two-step process. In the first step, a solution of a cationic polymer, e.g., polydiallyl dimethyl ammonium chloride, cationic polyacrylamide or polyamine, is added to the effluent to form a first mixture in which anionic charges carried by the solid particulates within the effluent may be substantially neutralized.

The second step of the process involves the formation of a second mixture by adding to the first mixture an effective amount, i.e., of between about 1 and 10,000 ppm and preferably between about 10-1,000 ppm, based on the weight of solids in the effluent, of an aqueous solution of the water-in-oil emulsion of partially hydrolyzed acrylamide polymer of the present invention to flocculate the solid particles for removal from the solution. As a result, a substantially clear effluent stream, substantially free of particulate material, is formed. For any particular flocculating application, the optimum amount of the emulsion to be added can be determined by one of ordinary skill in the art by conducting routine testing.

EXAMPLES

The following examples are provided for the purpose of illustration only and should not be construed as limiting the invention in any way.

EXAMPLE 1

An ultra-high molecular weight polymer emulsion is formed by bulk polymerization in the presence of a redox catalyst, as described above. To 2,000 parts of the back-bone emulsion is added:

| | |
|---|---|
| low odor petroleum oil | 75 parts |
| ethoxylated fatty amine | 46.2 parts |
| 30% NaOH | 287 parts |
| ethoxylated nonylphenyl inverting agent | 44 parts |

The mixture is allowed to react with stirring at a temperature of 25°–30° C. The resultant product has a solution viscosity (SV) of 11.4 mPa.s and a carboxylate content of 29 mole %. As discussed above, the carboxylate content of the polymer is indicative of the degree of hydrolysis which the polymer has undergone and corresponds to the solution viscosity of the polymer.

EXAMPLE 2

Example 1 is followed with the following exceptions: 478.3 parts of 30% NaOH and 47.9 parts of the ethoxylated nonlyphenyl inverting agent are used. The resultant product has a SV of 12.1 mPa.s and a carboxylate content of 45 mole %.

EXAMPLE 3

Clay Settling Tests

Kaolin clay dispersions in water (1000 ml samples in a one liter graduated cylinder) containing 5% solids are flocculated using the polymers described below which have been pre-dissolved in water prior to addition to the slurry. The flocculants are added at a concentration of 1.25 ppm on slurry. The settling time for the flocculated slurry is measured when the interface between clear liquid and clay dispersion is at 500 mls.

| Polymer | Settling time (secs.) |
|---|---|
| Polymer A | 195 |
| Polymer of Example 1 | 105 |
| Polymer of Example 2 | 75 |

This example demonstrates that the use of the polymers of the invention (i.e., those of Example I and II), provides an improvement (i.e., a reduction) in the settling time of the dispersion of between about 46–64%.

EXAMPLE 4

Coal Refuse Tests

Flocculation tests using coal refuse from two coal mines are conducted.

| Mine | Feed solids (%) | Ash (%) | pH | Polymer (ppm) | Settling Rate (ft/hour) |
|---|---|---|---|---|---|
| A | 7.70 | 64.9 | 7.5 | A (4.96) | 120 |
| A | 7.70 | 64.9 | 7.5 | Ex. 2 (5.0) | 170 |
| B | 5.27 | 52.9 | 7.5 | A (2.0) | 50 |
| B | 5.27 | 52.9 | 7.5 | Ex 2 (2.0) | 190 |

For mine A, therefore, the improvement (i.e., increase) in settling rate offered with the use of the flocculating agent of the invention is about 41%. For mine B, this improvement is about 280%.

EXAMPLE 5

Clarification of "Process Water" From Deinking Plant

An anionic PAM prepared by the method of Example 1 is tested for flocculating the washings from a paper deinking plant. The results are set forth below.

| Anionic PAM dose (ppm) | Polyamine dose (ppm) | Supernatant Clarity (NUTs) |
|---|---|---|
| 50 | 50 | 330 |
| 45 | 55 | 72 |
| 40 | 50 | 190 |
| 50 | 55 | 90 |

(600 ppm of alum, a cationic species, is added to all tests.)

EXAMPLE 6

Treatment of Waste-water From a Deinking Plant Using Dissolved Air Flotation Waste-water from a waste paper deinking plant is treated with a two stage flocculant treatment program in order to flocculate the detached ink prior to separation. The flocculated ink is then separated from the waste water by dissolved air flotation.

The two stage process involves adding a cationic polymer, a polyamine condensation product of epichlorohydrin and dimethylamine (from 27–34 ppm), and then a solution of a high molecular weight anionic polyacrylamide emulsion polymer. During the first test, a standard anionic copolymer emulsion similar in SV and charge to control polymer A (see Example 3) is added at a dosage range of 5–10 ppm. The average level of residual ink solids in the effluent after separating the flocculated ink solids is found to be 220 ppm. In the second test, a ultra high molecular weight anionic copolymer emulsion similar to Example 2 is added at a dosage range of 2.5–6 ppm. The average level of residual ink solids in the effluent is found to be 112 ppm. Thus, the novel polymers of the invention yield a substantially greater reduction in suspended solids than the prior art materials (i.e., polymer A) at dosages reduced from those of the prior art.

EXAMPLE 7

Flocculation of Paper Mill Effluent

Paper mill effluent is treated with a combination of 20 ppm polydiallyl dimethyl ammonium chloride ("polyDADM") and the anionic PAM of Example 1. The results are shown below.

| Anionic PAM | dose (ppm) | Floc size | Settling rate |
|---|---|---|---|
| Example 1 | 2 | small | medium |
| " | 3 | medium + | med-fast |
| " | 4 | v. large | fast |
| " | 5 | v. large | fast + |
| Control | 5 | med − | med − |

Control = standard anionic PAM prepared by copolymerization of acrylic acid and acrylamide similar in molecular weight and charge to Polymer A.

EXAMPLES 8 and 9

Example 1 is repeated except that lower amounts of NaOH are used to reduce the degree to which the resultant polymers are hydrolyzed. This reduction in the degree of hydrolysis also results in a correspondingly decreased SV of the polymer (relative to the product of Example 1).

| Example | 30% NaOH (parts) | SV (mPa.s) | Carboxyl Content (mole %) |
|---|---|---|---|
| 8 | 191.3 | 10.4 | 18 |

-continued

| Example | 30% NaOH (parts) | SV (mPa.s) | Carboxyl Content (mole %) |
|---|---|---|---|
| 9 | 95.7 | 9.4 | 9 |

EXAMPLES 10-12

Example 1 is repeated except that higher amounts of NaOH are used. In addition, part of the samples are heat treated. The result is a substantially greater degree of hydrolysis of the polymers as indicated by the carboxylate values set forth below. In all cases stable emulsions are produced.

| Example | NaOH/PAM | SV | CXL(a) (mole %) | CXL(b) (mole %) | CXL(c) (mole %) |
|---|---|---|---|---|---|
| 10 | 0.9 | 9.5 | 55 | 63 | 72 |
| 11 | 1.25 | 9.1 | 61 | 71 | 84 |
| 12 | 1.5 | 9.5 | 64 | 60 | 86 |

CXL = carboxyl (in mole %):
a. reaction at room temp.
b. reaction at 60 degs. C. for 64 hours
c. as b. analysis performed 8 days later

EXAMPLE 13

Example 1 is repeated. The product has a SV of 10.86 and an IV of 50.4 dl/g. [This corresponds to a molecular weight of 60.7 million using formula 1., i.e., IV = 0.000373 × molecular weight$^{0.66}$.]

A sample of a commercially available acrylic acid-/AMD copolymer has a SV of 6.08 mPa.s and an IV of 29.7 dl/g (molecular weight = 26 million).

EXAMPLE 14

Example 1 is repeated. The polymer has a SV of 10.0. Clay settling tests, as in Example 3, are conducted comparing performance against other anionic PAMS.

| Polymer | Dose required to give 10 feet/hour Settling Rate Dose Relative to Ex. 14 |
|---|---|
| That of Ex. 14 | 1.0 |
| Competitive dry PAM A. | 1.29 |
| Competitive dry PAM B. | 1.41 |
| Competitive dry PAM C. | 1.397 |
| Competitive emulsion PAM D. | 2.05 |
| Competitive emulsion PAM E. | 2.68 |
| Competitive emulsion PAM F. | 2.71 |

This example demonstrates that a substantially greater amount of the prior art material is required to attain the same results (i.e., a settling rate of 10 feet/hour) as that achievable with use of the polymer of the present invention.

EXAMPLE 15

Example 1 of Connolly U.S. Pat. No. 4,171,296 is repeated exactly as described. The emulsion product (polymer control Q) has a SV of 6.85 mPa.s (M.W. = about 30 million). A sample of the polymer is precipitated for analysis. The precipitated polymer contains 35 mole % carboxylate.

In addition, Example 1 of the present application is repeated. The SV of the emulsion product so produced is 11.17 mPa.s and the carboxylate content of the precipitated polymer is 35 mole %. Clay settling tests as described in Example 3 are conducted and the results shown below:

Also, the procedure of Example 1 is followed to produce a lower molecular weight polyacrylamide having a SV of 6.5 mPa.s, i.e., about 28,000,000 M.W., which is then hydrolyzed as described. This PAM is identified below as Polymer B.

| | Settling Rate (ft/hours) | | |
|---|---|---|---|
| Dose lb/ton | Control Polymer Q | Polymer of Example 1 | Polymer B |
| 0.5 | — | 11.97 | 8.68 |
| 0.75 | — | 22.77 | 15.05 |
| 1.0 | 5.48 | 37.37 | 24.09 |
| 2.00 | 10.92 | — | — |
| 3.00 | 19.56 | — | — |

These data clearly demonstrate the superiority of the high molecular weight polymers of the present invention.

EXAMPLES 16 and 17

Example 1 is repeated except that the molecular weight of the polyacrylamide back-bone emulsion reactant is reduced by adding isopropanol chain-transfer agent to the monomer prior to polymerization. The hydrolysis reaction is then carried out as described in Example 1.

| Example | Isopropanol (% on monomer) | SV of Final Product | Approx. MW |
|---|---|---|---|
| 16 | 0.75% | 6.17 | 27 million |
| 17 | 1.75% | 4.91 | 20 million |

EXAMPLES 18-23

Example 1 is repeated except that various stabilizing surfactants are added. In addition, an ethoxylated alcohol inverting surfactant is used.

| Example | Stabilizer Surfactant | SV of final product |
|---|---|---|
| 18 | isopropylamide of oleic acid* | 10.64 |
| 19 | polyoxyethylene oleyl ether (HLB = 8.2) | 10.03 |
| 20 | polyoxyethylene oleyl ether (HLB = 5.0) | 10.74 |
| 21 | substituted imidazoline of oleic acid | 11.11 |
| 22 | diethanolamide of oleic acid* | 10.64 |
| 23 | polyoxyethylene lauryl ether | 10.50 |

*not alkali stable

While it is apparent that the invention herein disclosed is well calculated to fulfill the objectives stated above, it well be appreciated that numerous modifications and embodiments may be devised by those skilled in the art, and it is intended that the appended claims cover all such modifications and embodiments as fall within the true spirit and scope of the present invention.

We claim:

1. A method of preparing a flocculating agent having improved properties which comprises:
   a) providing a water-in-oil emulsion which comprises, as a discontinuous phase, small droplets of an aqueous acrylamide monomer solution containing a redox polymerization catalyst and, as a continuous phase, a liquid hydrocarbon containing an oil soluble emulsifying agent;

b) polymerizing said acrylamide monomer to form aqueous acrylamide polymer droplets as the discontinuous phase; and c) reacting said acrylamide polymer with an alkali metal hydroxide or quaterary ammonium hydroxide to hydrolyze at least a portion of said polymer to produce a polymer having a molecular weight of at least about 10 million as indicated by an intrinsic viscosity of at least about 15 dl/g. and a solution viscosity of at least about 4 mPa.s.

2. The method of claim 1 wherein said polymer has a molecular weight of at least about 20,000,000 as indicated by an intrinsic viscosity of at least about 32 dl/g. and a solution viscosity of at least about 7 mPa.s.

3. The method of claim 2 which further comprises adding to the emulsion, before step c), a stabilizing compound selected from the group consisting of an oil-soluble emulsifying agent and an organic surfactant.

4. The method of claim 3 wherein said emulsion is stabilized by adding said oil soluble emulsifying agent thereto in an amount of between 0.1 and 30% by weight, based upon the weight of the oil.

5. The method of claim 3 wherein said emulsion is stabilized by adding said organic surfactant thereto in a concentration of from about 0.10 to 15% by weight.

6. The method of claim 1 which further comprises adding an inverting agent to said hydrolyzed high molecular weight PAM dispersion to release said hydrolyzed particles in an aqueous solution.

7. The method of claim 6 wherein said inverting agent is nonylphenyl ethoxylate.

8. The method of claim 1 which further comprises selecting tertiary butyl hydroperoxide-sodium metabisulfite or sulfur dioxide as the redox catalyst.

* * * * *

US005286806C1

(12) REEXAMINATION CERTIFICATE (4259th)
United States Patent
Neff et al.

(10) Number: US 5,286,806 C1
(45) Certificate Issued: Jan. 30, 2001

(54) METHODS OF MAKING AND USING HIGH MOLECULAR WEIGHT ACRYLAMIDE POLYMERS

(75) Inventors: Roger E. Neff, Stamford; Roderick G. Ryles, Milford, both of CT (US)

(73) Assignee: Cytec Technology Corp., Wilmington, DE (US)

Reexamination Requests:
No. 90/004,107, Jan. 18, 1996
No. 90/004,615, Apr. 28, 1997

Reexamination Certificate for:
Patent No.: 5,286,806
Issued: Feb. 15, 1994
Appl. No.: 08/062,379
Filed: May 14, 1993

(51) Int. Cl.$^7$ .................................................. C08F 8/12
(52) U.S. Cl. .................... 525/369; 525/378; 525/329.4; 524/555; 524/801
(58) Field of Search ............................................... 525/369

(56) References Cited

U.S. PATENT DOCUMENTS

| | | | |
|---|---|---|---|
| 3,284,393 | * 11/1966 | Vanderhoff et al. | 525/369 |
| 3,624,019 | * 11/1971 | Anderson et al. | 525/369 |
| 4,034,809 | 7/1977 | Phillips et al. . | |
| 4,146,690 | * 3/1979 | Tago et al. | 525/369 |
| 4,171,296 | * 10/1979 | Connelly et al. | 525/369 |
| 4,339,371 | * 7/1982 | Robinson et al. | 524/310 |
| 4,482,682 | * 11/1984 | Kudomi et al. | 525/369 |
| 4,535,131 | * 8/1985 | Handa et al. | 525/369 |
| 4,673,716 | * 6/1987 | Siano et al. | 525/369 |
| 5,081,195 | * 1/1992 | Atkins et al. | 525/369 |

FOREIGN PATENT DOCUMENTS 2281387   3/1976   (FR) ............................ C08F/120/56

OTHER PUBLICATIONS

CA 99: 71334s: *Chemical Abstracts*, vol. 99, No. 10, Sep. 5, 1983.

* cited by examiner

*Primary Examiner*—Fred M. Teskin

(57) ABSTRACT

Dispersions of finely divided high molecular weight polyacrylamide particles are formed and treated with a caustic material to hydrolyze the polymer without undesirable side chain reactions to form high molecular weight anionic acrylamide polymers. A preferred technique for forming these products comprises the formation of a stabilized water-in-oil emulsion of aqueous acrylamide monomer, polymerizing the monomer, reacting the polymer emulsion thus formed with a hydrolysis agent and inverting the resultant hydrolyzed polymers into solution. These materials are useful in a variety of industrial applications for removing particulates from effluent streams.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 2, line 51 through column 3, line 4:

In the invention, liquid streams, i.e., of the type described above, are treated with a polymer solution prepared as follows: A water-in-oil emulsion which comprises, as the discontinuous phase, small droplets of an aqueous acrylamide monomer solution containing a redox polymerization catalyst and, as the continuous phase, a liquid hydrocarbon containing an oil-soluble emulsifying agent is formed. The acrylamide monomer is then polymerized to form aqueous acrylamide polymer droplets within the emulsion. One embodiment of the invention utilizes high molecular weight polymers with a molecular weight of 10+ million. In a further embodiment, ultra high molecular weight polymers, with a molecular weight above about 27 million are used. At molecular weights of about 27 million and above, the need to reduce or eliminate side chain reaction becomes a factor in the polymer forming process. In a still further embodiment, the molecular weight range of the ultra high molecular weight polymers used is 34+ million. The emulsion is stabilized by the addition of *a stabilizing compound selected from the group consisting of* an oil-soluble emulsifying agent [or] *and* an organic surfactant.

AS A RESULT OF REEXAMINATION, IT HAS BEEN DETERMINED THAT:

Claims 1–3 and 6 are determined to be patentable as amended.

Claims 4, 5, 7, and 8, dependent on an amended claim, are determined to be patentable.

New claims 9–11 are added and determined to be patentable.

1. A method of preparing a flocculating agent having improved properties which comprises:
   a) providing a water-in-oil emulsion which comprises, as a discontinuous phase, small droplets of an aqueous acrylamide monomer solution containing a redox polymerization catalyst and, as a continuous phase, a liquid hydrocarbon containing an oil soluble emulsifying agent;
   b) polymerizing said acrylamide monomer to form aqueous acrylamide polymer droplets as the discontinuous phase *within the emulsion*; and
   c) reacting said acrylamide polymer with an alkali metal hydroxide or quaternary ammonium hydroxide to hydrolyze at least [a portion] *about 10 mole %* of said polymer to produce a *partially hydrolyzed* polymer *having a degree of hydrolysis of about 10 mole % or greater and* having a molecular weight of [at least about 10] *30* million *or greater* as indicated by an intrinsic viscosity of [at least about 15] *32* dl/g *or greater* and a solution viscosity of [at least about 4] *8* mPa.s *or greater, while retaining the partially hydrolyzed polymer dispersed throughout a stable water-in-oil emulsion, wherein said partially hydrolyzed polymer has a solution viscosity of at least 8 mPa.s at a degree of hydrolysis of about 10 mole %*.

2. The method of claim 1 wherein said polymer [has a molecular weight of at least about 20,000,000 as indicated by an intrinsic viscosity of at least about 32 dl/g and a solution viscosity of at least about 7 mPa.s] *is hydrolyzed to about 20 mole % or more*.

3. The method of claim [2] *1* which further comprises adding to the emulsion, before step c), a stabilizing compound selected from the group consisting of an oil-soluble emulsifying agent and an organic surfactant.

6. The method of claim 1 which further comprises adding an inverting agent to said *partially* hydrolyzed [high molecular weight PAM] *acrylamide polymer* dispersion to release [said hydrolyzed particles] *the partially hydrolyzed acrylamide polymer* in an aqueous solution.

9. *The method of claim 1, wherein said partially hydrolyzed polymer has a degree of hydrolysis of from about 10 to about 50 mole %.*

10. *A method of preparing a flocculating agent having improved properties which comprises:*

*providing a water-in-oil emulsion which comprises, as a discontinuous phase, small droplets of an aqueous acrylamide monomer solution containing a redox polymerization catalyst and, as a continuous phase, a liquid hydrocarbon containing an oil soluble emulsifying agent;*

*polymerizing said acrylamide monomer to form aqueous acrylamide polymer droplets as the discontinuous phase within the emulsion;*

*adding an emulsion stabilizing compound to the emulsion before the polymer is hydrolyzed; and*

*reacting said acrylamide polymer with an alkali metal hydroxide or quaternary ammonium hydroxide to hydrolyze at least about 10 mole % of said polymer to produce a partially hydrolyzed polymer having a degree of hydrolysis of about 10 mole % or greater and having a molecular weight of 30 million or greater as indicated by an intrinsic viscosity of 32 dl/g or greater and a solution viscosity of 8 mPa.s or greater, said emulsion stabilizing compound being present in an amount sufficient to enable the partially hydrolyzed polymer to remain dispersed throughout a stable water-in-oil emulsion, wherein said partially hydrolyzed polymer has a solution viscosity of at least 8 mPa.s at a degree of hydrolysis of about 10 mole %.*

11. *The method of claim 10, wherein said partially hydrolyzed polymer has a degree of hydrolysis of from about 10 to about 50 mole %.*

* * * * *